(12) United States Patent
Yamanaka et al.

(10) Patent No.: US 8,013,721 B2
(45) Date of Patent: Sep. 6, 2011

(54) DISPLAY APPARATUS DISPLAYING IMAGE OF SURROUNDINGS OF VEHICLE

(75) Inventors: Takashi Yamanaka, Kariya (JP); Shoichi Hashiba, Kiraya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/890,066

(22) Filed: Sep. 24, 2010

(65) Prior Publication Data

US 2011/0013019 A1 Jan. 20, 2011

Related U.S. Application Data

(62) Division of application No. 11/938,972, filed on Nov. 13, 2007, now Pat. No. 7,825,784.

(30) Foreign Application Priority Data

Nov. 14, 2006 (JP) .................................. 2006-308085

(51) Int. Cl.
*B60Q 1/00* (2006.01)
(52) U.S. Cl. ...................... 340/435; 340/932.2; 340/933; 340/944; 340/908; 340/436; 340/441; 340/438; 340/691.6; 348/113; 348/118; 348/119; 348/148; 701/41; 701/208; 701/300; 701/301
(58) Field of Classification Search .................. 340/435, 340/932.2, 933, 944, 908, 436, 411, 438, 340/691.6; 348/113, 118, 119, 148; 701/41, 208, 300, 301
See application file for complete search history.

(56) References Cited

U.S. PATENT DOCUMENTS

| 5,418,610 | A | * | 5/1995 | Fischer ........................... 356/21 |
|---|---|---|---|---|
| 6,654,670 | B2 | * | 11/2003 | Kakinami et al. ................ 701/1 |
| 6,825,880 | B2 | | 11/2004 | Asahi et al. |
| 6,940,423 | B2 | | 9/2005 | Takagi et al. |
| 7,012,549 | B2 | | 3/2006 | Mizusawa et al. |
| 7,012,550 | B2 | * | 3/2006 | Iwakiri et al. .............. 340/932.2 |
| 7,295,227 | B1 | * | 11/2007 | Asahi et al. ................... 348/118 |
| 2003/0060972 | A1 | | 3/2003 | Kakinami |

FOREIGN PATENT DOCUMENTS

| JP | 07-174576 A | 7/1995 |
|---|---|---|
| JP | 11-334470 A | 12/1999 |

* cited by examiner

*Primary Examiner* — Tai T Nguyen
(74) *Attorney, Agent, or Firm* — Sughrue Mion, PLLC

(57) ABSTRACT

A display apparatus displaying an image of surroundings of a vehicle includes a camera capturing an image of the surroundings of the vehicle, and a display monitor provided inside the vehicle for superimposingly displaying the image of the surroundings of the vehicle captured by the camera, and a first distance indicator line and a second distance indicator line, wherein the first distance indicator line indicates a first predetermined distance from the vehicle and the second distance indicator line indicates a second predetermined distance from the vehicle, the second distance indicator line is positioned farther away from the vehicle than the first distance indicator line, and the first distance indicator line is wider than the second distance indicator line.

20 Claims, 2 Drawing Sheets

DISPLAY APPARATUS DISPLAYING IMAGE OF SURROUNDINGS OF VEHICLE

CROSS REFERENCE TO RELATED APPLICATIONS

This application is a Divisional Application of U.S. application Ser. No. 11/938,972 filed Nov. 13, 2007, issued as U.S. Pat. No. 7,825,784, which is based on and claims priority under 35 U.S.C. §119 to Japanese Patent Application 2006-308085, filed on Nov. 14, 2006; the disclosure of the prior applications are incorporated herein by reference.

FIELD OF THE INVENTION

This invention generally relates to a display apparatus displaying an image of surroundings of a vehicle.

BACKGROUND

Among conventional methods for assisting a beginner during a parking operation, who is not familiar with parallel parking and/or perpendicular parking operations, for example, a method described in JP11-334470A is known. A parking assist system disclosed in the JP11-334470A includes a CCD camera provided at a back of a vehicle for capturing an image behind the vehicle and a monitor display for displaying the image captured by the CCD camera. On the monitor display, a traveling locus of the vehicle, predicted based on a steering angle, and the image behind the vehicle are superimposedly displayed. The predicted traveling locus of the vehicle includes a line indicating a moving direction of the vehicle and distance indicator lines indicating distances from the vehicle. The distance indicator lines include the distance indicator line positioned near the vehicle and another distance indicator line positioned farther away from the vehicle than the distance indicator line displayed near the vehicle.

JP7-174576A discloses a method for displaying information of an intersection and an apparatus for providing road information, which allows an easy identification of types of roads at an intersection by providing an appropriate display setting for a driver having color weakness or being color blind, or for a vehicle passenger affected by a reflection of a display screen to better suit individual visual capability. More specifically, the method for displaying information and the display apparatus allow the driver and the vehicle passenger to identify different types of roads by means of arrows having different patterns and widths. In addition, the method for displaying information and the display apparatus allow the driver and the vehicle passenger to set a display style based on a visual capability of a user by means of "a style for displaying the types of roads and direction", utilizing elements of, for example, shapes, colors and light-dark intensity.

However, in the predicted traveling locus of the vehicle of JP11-334470A, the lines closer to the vehicle and the lines farther away from the vehicle, specifically the distance indicator line positioned closer to the vehicle and the distance indicator line positioned farther away from the vehicle than the distance indicator line positioned closer to the vehicle, are displayed in approximately the same widths. Consequently, a person having normal eyesight and a person having color weakness may find it difficult to identify the distance indicator lines. In this case, parking assist may not work best.

The method and the apparatus disclosed in JP7-174576A allow the person having color weakness to set the display setting based on the visual capability of a user, however, they do not facilitate a better sense of distance relative to the vehicle. In addition, according to the method and the apparatus disclosed in JP7-174576A, the display setting needs to be changed to suit the use by the person having normal eyesight and by a person having color weakness individually, which may lead to misidentification of lines or misoperation in case of an inappropriate display setting.

A need thus exists for a display apparatus displaying an image of surroundings of a vehicle, which is not susceptible to the drawback mentioned above.

SUMMARY OF THE INVENTION

In light of the foregoing, the present invention provides a display apparatus displaying an image of surroundings of a vehicle, which includes a camera capturing an image of the surroundings of the vehicle; and a display monitor provided inside the vehicle for superimposingly displaying the image of the surroundings of the vehicle captured by the camera, and a first distance indicator line and a second distance indicator line, wherein the first distance indicator line indicates a first predetermined distance from the vehicle and the second distance indicator line indicates a second predetermined distance from the vehicle, the second distance indicator line is positioned farther away from the vehicle than the first distance indicator line, and the first distance indicator line is wider than the second distance indicator line.

DETAILED DESCRIPTION

One embodiment according to the present invention will be described below with reference to the attached drawings.

Figure 3:
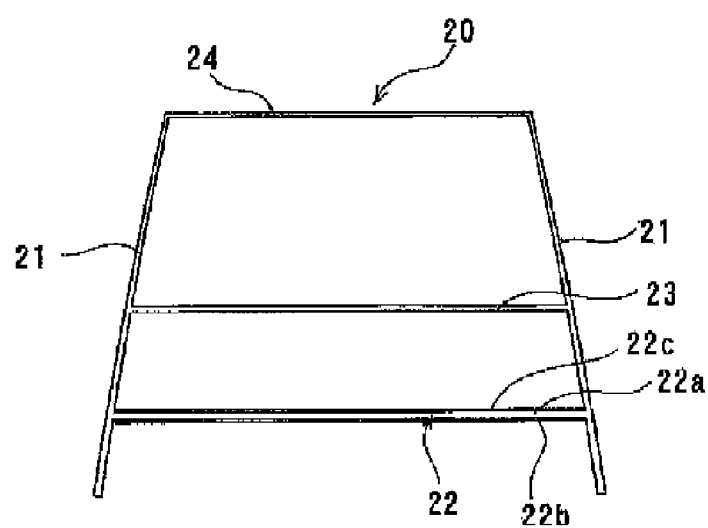
FIG. 3 is a diagram showing a predicted traveling locus displayed on the screen illustrated in FIG. 2. (For an explanatory purpose, only the predicted traveling locus is extracted and displayed.)

A display apparatus 1 for displaying an image of surroundings of a vehicle is applicable to a back-in parking operation including a perpendicular parking operation (a parking mode where a vehicle is parked perpendicular to, for example, a curb of a road) and to a parallel parking operation (a parking mode where a vehicle is parked parallel to, for example, a curb of a road and where the vehicle is parallel to the curb or the road when the parking operation begins). The embodiment shown in FIG. 1 and FIG. 3 is an example where the display apparatus 1 for displaying the image of the surroundings of the vehicle is applied, for example, to a parking assist system for assisting the perpendicular parking.

Figure 1:
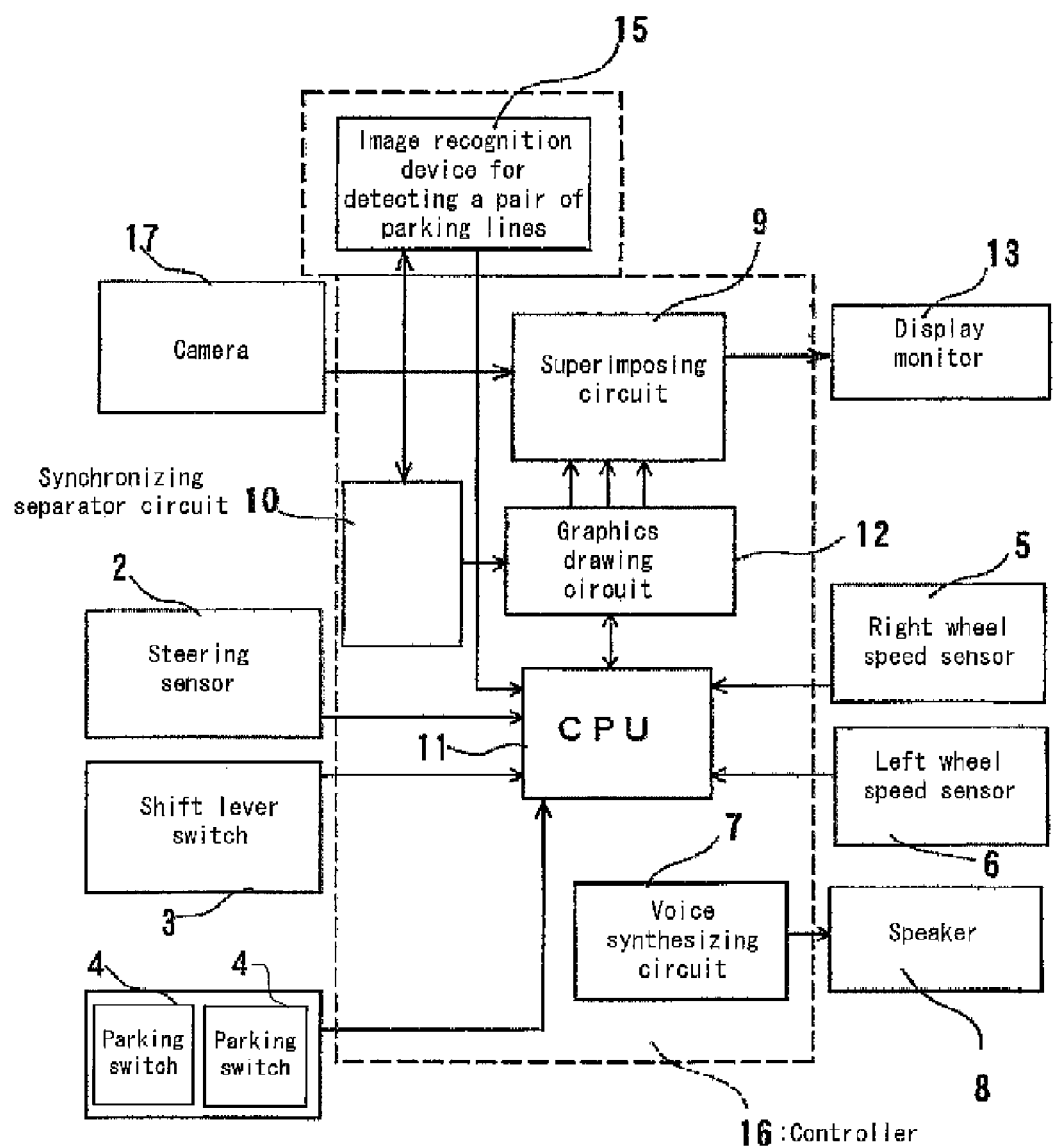
FIG. 1 is a system configuration diagram of a display apparatus for displaying an image of surroundings of a vehicle according to the embodiment of the present invention.

As shown in FIG. 1, the display apparatus 1 (i.e., serving as the parking assist system) for displaying the image of the surroundings of the vehicle according to the embodiment includes a controller 16, a camera 17 (according the embodiment, a camera for capturing an image behind the vehicle is applied), a steering sensor 2 for detecting a steering angle of a steering wheel, a shift lever switch 3 for detecting whether a shift lever of a transmission is in a reverse position, parking switches 4, 4 for selecting a mode of parking, for example the parallel parking or the perpendicular parking, a right wheel speed sensor 5 and a left wheel speed sensor 6 for detecting wheel speed of a right driven wheel and a left driven wheel respectively, a speaker 8, a display monitor 13 and an image recognition device 15 for detecting a pair of parking lines 35, 35.

As shown in FIG. 1, the controller 16 includes a CPU 11 for performing control, a graphics drawing circuit 12 for drawing graphics on the display monitor 13, a superimposing circuit 9 for superimposing a graphic signal and a captured image by the camera 17 on the display monitor 13, a synchronizing separator circuit 10 for extracting synchronizing signals out of the image captured by the camera 17 and for supplying the synchronizing signals to the graphics drawing circuit 12, the image recognition device 15 for detecting the pair of parking lines 35, 35 by receiving signals from the camera 17 and then recognizing an image of the pair of parking lines 35, 35, and a voice synthesizing circuit 7 for outputting synthesized voice to the speaker 8. The image recognition device 15 may be provided separately from the controller 16.

As shown in FIG. 1, signals from the camera 17, the steering sensor 2, the shift lever switch 3, the parking switches 4, 4 and the wheel speed sensors 5, 6 are input to the controller 16. Based on these signals, the controller 16 superimposingly displays the image behind the vehicle and the below-mentioned predicted traveling locus 20, on a screen 14 of the display monitor 13, and the speaker 8 emits voice messages to a driver.

Figure 2:
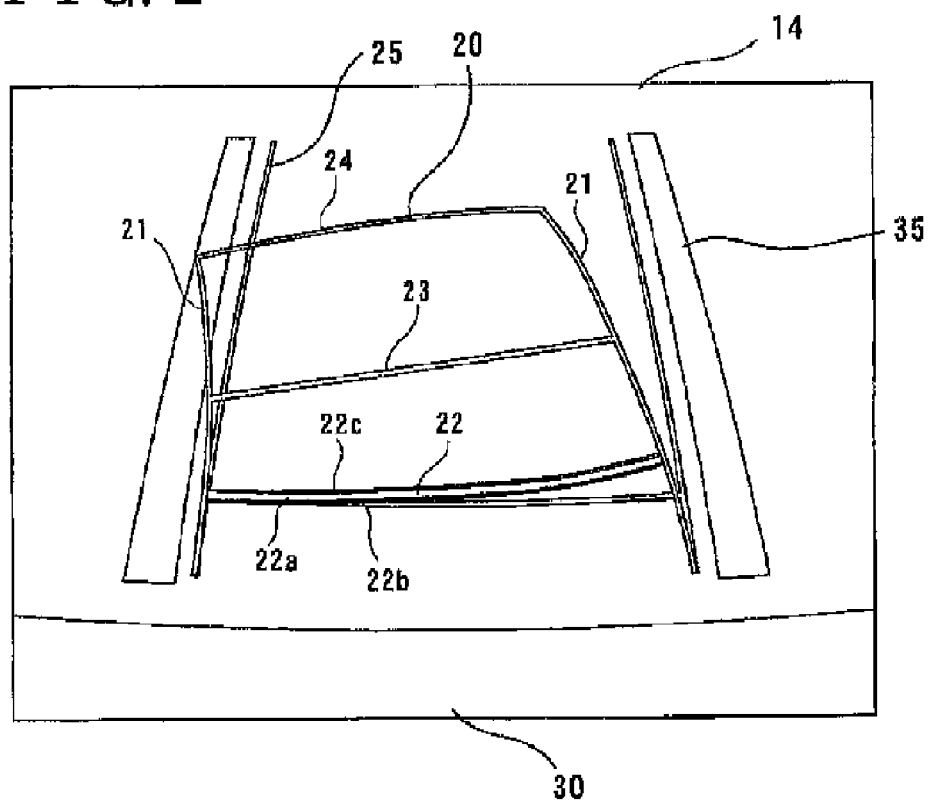
FIG. 2 is a diagram showing a screen of a display monitor during the parallel parking operation.

In the display apparatus 1 for displaying the image of the surroundings of the vehicle having the above described configuration, when an ignition of the vehicle is on and when the shift lever is moved into in the reverse position, a parking assist screen appears on the display monitor 13, where the image behind the vehicle and the predicted traveling locus 20 are superimposedly displayed as shown in FIG. 2. Under this condition, selection switches (the parking switches 4, 4) for actuating, for example, the parking assist for the parallel parking operation or the perpendicular parking operation appear on the display. According to the embodiment, the parking assist for the perpendicular parking operation is selected.

As the screen 14 superimposingly displays the image behind the vehicle and the predicted traveling locus 20, the driver maneuvers and then maintains the steering wheel in an appropriate position, and drives the vehicle backward while looking at the screen 14 or physically looking back. To complete parking the vehicle properly between the pair of parking lines 35, 35, the driver counter steers the steering wheel and drives the vehicle backward to a furthest rear position of the pair of parking lines 35, 35 once the vehicle is positioned parallel to the pair of parking lines 35, 35.

As shown in FIG. 2, the predicted traveling locus 20 includes a pair of lines 21, 21 each arranged on right and left in the display monitor (i.e., serving as a pair of lines each extending in a direction that the vehicle is predicted to move), which are cooperated with a steering operation and are changeable so as to extend in a direction that the vehicle is expected to move. The predicted traveling locus 20 also includes distance indicator lines 22, 23 and 24 (i.e., serving as a first distance indicator line 22, a second distance indicator line 23 and a third distance indicator line 24) indicating predetermined distances from the vehicle respectively, which are cooperated with the steering operation and change each position so as to indicate each distance from the vehicle. Vehicle width extension lines 25, 25 showing for reference vehicle's predicted traveling locus when the vehicle moves backward in a straight manner are also superimposed on the image behind the vehicle and displayed on the screen 14 of the display monitor 13. The vehicle width extension lines 25, 25 are displayed being overlapped with the predicted traveling locus 20 when the vehicle is moving straight. A bumper 30 of the vehicle is shown at a bottom portion of the screen 14 as shown in FIG. 2.

The distance indicator lines 22, 23 and 24 include the first distance indicator line 22 indicating a first predetermined distance from the vehicle, the second distance indicator line 23 indicating a second predetermined distance from the vehicle and the third distance indicator line 24. The second distance indicator line 23 is positioned farther away from the vehicle than the first distance indicator line 22. The third distance indicator line 24 is positioned farther away from the vehicle than the second distance indicator line 23. In the embodiment shown in FIGS. 2 and 3, the distance indicator lines 22, 23 and 24 extended in a lateral direction of the vehicle relative to the pair of lines 21, 21 each arranged on the right and left, that is, the distance indicator lines 22, 23 and 24 extend in a horizontal direction of FIG. 2. Specifically, first ends and second ends of the distance indicator lines 22 and 23 are connected to the pair of lines 21, 21 respectively, at points each located along the pair of lines 21, 21. A first end and a second end of the distance indicator line 24 are connected to the pair of lines 21, 21 each arranged on the right and left at distal ends thereof, respectively.

The first distance indicator line 22 is positioned, for example, approximately 0.5 meters from a rear end of the bumper 30 of the vehicle and the second distance indicator line 23 is positioned approximately 1.0 meter from the rear end of the bumper 30 of the vehicle. The driver recognizes a position of the vehicle relative to the target parking space by looking at the distance indicator lines 22, 23 and 24. According to the embodiment, the first distance indicator line 22 is positioned closest to the end of the bumper 30 of the vehicle.

As shown in FIG. 2, the first distance indicator line 22 is wider than the second distance indicator line 23 and the second distance indicator line 23 is wider than the third distance indicator line 24. That is, the distance indicator lines 22, 23 and 24 are displayed in different widths according to each distance from the vehicle, so that the nearer the line is to the vehicle, the wider the line is displayed.

With the above described structure, it is certainly recognized that the distance indicator line 22 is closer to the vehicle compared to that the distance indicator line 23 and the distance indicator line 23 is closer to the vehicle compared to that the distance indicator line 24, thereby allowing both a person having normal eyesight and a person having color weakness to certainly have a sense of distance. For example, in case the first distance indicator line 22 is displayed in red, the first distance indicator line 22 looks darker to a person having less sensitivity to red, which may make it difficult for the person having less sensitivity to red to identify the distance indicator line 22. By displaying the first distance indicator line 22 wider than the second distance indicator line 23 according to the embodiment, the first distance indicator line 22 is identified with a good perspective relative to the second distance indicator line 23, thus assuring the sense of distance.

The first distance indicator line 22 preferably includes a main line 22a and additional portions 22b and 22c (i.e., serving as a shaded portion and a highlighted portion respectively) having different colors or darker tones from the main line 22a, and displayed along the main line 22a.

That is, the first distance indicator line 22 is preferably formed by plural lines having different colors or darker tones and being arranged adjacent to each other in a moving direction of the vehicle.

Specifically, according to the embodiment shown in FIGS. 2 and 3, the first distance indicator line 22 includes the main line 22a, the shaded portion 22b displayed along a closer portion of the main line 22a to the vehicle, and the highlighted portion 22c displayed along a farther portion of main line 22a from the vehicle. According to the embodiment, the additional portions 22b and 22c are displayed along the both sides of the main line 22a in the moving direction of the vehicle respectively but are not limited to this and the additional portion may be displayed along only one side of the main line 22a. For example, only one of the shaded portion 22b and the highlighted portion 22c may be displayed.

In addition, the main line 22a is preferably displayed in such a color that draws attention of the person having normal eyesight, for example, red. The shaded portion 22b is preferably displayed in, for example, black. The highlighted portion 22c is preferably displayed in yellow because the color is easily identified by the person having color weakness.

According to the embodiment as shown in FIG. 2, the first distance indicator line 22 is formed by the lines each having different colors and widths (the main line 22a, the shaded portion 22b and the highlighted portion 22c), however, the first distance indicator line 22 may be formed by the lines having approximately same widths.

The main line 22a, constituting the distance indicator line 22, is preferably wider than the second distance indicator line 23.

According to the embodiment, the distance indicator lines 22, 23 and 24 are shown as full lines but are not limited to the full lines and may be shown as dashed lines, alternate long and short dashed lines or any other types of lines as long as serving as an indication of the distance. A concept of the distance indicator lines also includes multiple rectangular markers aligned on a straight line. In addition, the first distance indicator line 22 does not need to be displayed all through between the pair of lines 21, 21 each arranged on the right and left and may only be displayed in vicinities of the pair of lines 21, 21 respectively. According to the embodiment, the three distance indicator lines 22, 23 and 24 are displayed but two distance indicator lines, or four distance indicator lines may be displayed.

The pair of lines 21, 21 are preferably displayed so as to be gradually wider in portions that are closer to the vehicle in order to provide a better sense of distance. Other lines, included in the predicted traveling locus 20 than the first distance indicator line 22, are displayed in yellow.

The vehicle width extension lines 25, 25 are displayed preferably in blue, considering a visibility of the person having color weakness. Further, the vehicle width extension lines 25, 25 may be displayed so as to be displayed gradually wider in portions that are closer to the vehicle.

An application of the display apparatus 1 displaying the surroundings of the vehicle is not limited to the parking assist system assisting the perpendicular parking operation. The display apparatus 1 displaying the surroundings of the vehicle may be applied to the parking assist system assisting the parallel parking operation or assisting a street-side parking operation (a parking mode where a vehicle is parked on a roadside), or may be applied to a system for guiding a forward movement of a vehicle, which is adapted to the parking assist system. Further, the display apparatus 1 for displaying the surroundings of the vehicle may be applied to other devices than the parking assist device. According to the embodiment, the surroundings of the vehicle includes behind the vehicle, in front of the vehicle and sides of the vehicle. The image of the surroundings of the vehicle is not limited to the image captured by the camera 17 for capturing the image behind the vehicle as shown in the embodiment and may be images captured by a front camera or a side camera. Also, the configuration of the display apparatus is not limited to the configuration described above.

According to the described subject matter, the above structure allows both the person having normal eyesight and the person having color weakness to easily have the sense of distance without changing the display setting.

According to the described subject matter, the image of the surroundings of the vehicle includes the image of the surroundings of the vehicle captured by the camera 17 in the moving direction of the vehicle.

With the structure according to the described subject matter, both the person having normal eyesight and the person having color weakness certainly have the sense of distance from the vehicle in the moving direction of the vehicle.

According to the described subject matter, the display apparatus 1 displaying the image of the surroundings of the vehicle further includes the third distance indicator line 24 positioned farther away from the vehicle than the second distance indicator line 23 and the second distance indicator line 23 is wider than the third distance indicator line 24.

With the structure according to the described subject matter, both the person having normal eyesight and the person having color weakness certainly have the sense of distance from the vehicle without changing the display setting.

According to the described subject matter, the display monitor 13 superimposingly displays the image of the surroundings of the vehicle captured by the camera 17, the first distance indicator line 22 and the second distance indicator line 23, and the pair of lines 21, 21, wherein the pair of lines 21, 21 are arranged on right and left so as to extend in the direction that the vehicle is predicted to move, and the first distance indicator line 22 and the second distance indicator line 23 laterally extend relative to the pair of lines 21, 21.

With the structure according to the described subject matter, both the person having normal eyesight and the person having color weakness certainly have the sense of distance from the vehicle during the parking operation without changing the display setting.

According to the described subject matter, each of the first distance indicator line 22 or the second distance indicator line 23 is formed by plural lines having different colors and arranged adjacent to each other in the moving direction of the vehicle respectively.

According to the described subject matter, the first distance indicator line 22 includes the main line 22a and the shaded portion 22b displayed along the main line 22a.

With the structure according to the described subject matter, the main line 22a is prevented from blending into a background screen, thus allowing the person having color weakness an improved visibility of the first distance indicator line 22 positioned closer to the vehicle.

According to the described subject matter, the first distance indicator line 22 includes the main line 22a and a yellow line displayed along the main line 22a.

According to the described subject matter, the above structure allows the person having color weakness an improved visibility of the distance indicator line 22 displayed closer to the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A display apparatus displaying an image of surroundings of a vehicle, comprising:
    a camera capturing the image of the surroundings of the vehicle; and
    a display monitor provided inside the vehicle for superimposingly displaying the image of the surroundings of the vehicle captured by the camera and a distance indicator line, which indicates a position a predetermined distance away from the vehicle, wherein
    the distance indicator line includes a main line and a shaded portion displayed so as to extend adjacently along and touching the main line.

2. The display apparatus displaying the image of the surroundings of the vehicle according to claim 1, wherein the shaded portion is displayed along the main line so as to be positioned closer to the vehicle.

3. The display apparatus displaying the image of the surroundings of the vehicle according to claim 1, wherein the shaded portion is displayed below the main line on the display monitor.

4. The display apparatus displaying the image of the surroundings of the vehicle according to claim 1, wherein the shaded portion is displayed so as to be adjacent to the main line.

5. The display apparatus displaying the image of the surroundings of the vehicle according to claim 1, wherein the surroundings of the vehicle includes a view extending rearwardly of the vehicle.

6. The display apparatus displaying the image of the surroundings of the vehicle according to claim 1, wherein the display monitor superimposingly displays the image of the surroundings of the vehicle captured by the camera, the distance indicator line and a pair of lines, which extend to right and left in a direction to which the vehicle is expected to move, and the distance indicator extends in a right-left direction relative to the pair of lines.

7. The display apparatus displaying the image of the surroundings of the vehicle according to claim 6, wherein the distance indicator line is displayed between the pair of lines.

8. The display apparatus displaying the image of the surroundings of the vehicle according to claim 6, wherein the distance indicator line is displayed only in the vicinity of the pair of lines.

9. The display apparatus displaying the image of the surroundings of the vehicle according to claim 1, wherein the main line is displayed in a red color.

10. A display apparatus displaying an image of surroundings of a vehicle, comprising:
    a camera capturing the image of the surroundings of the vehicle; and
    a display monitor provided inside the vehicle for superimposingly displaying the image of the surroundings of the vehicle captured by the camera and a distance indicator line, which indicates a position a predetermined distance away from the vehicle, wherein
    the distance indicator fine includes a main line and an additional portion, which is displayed in a color differing from a color of the main line, the additional portion extends adjacently along and touching the main line.

11. The display apparatus displaying the image of the surroundings of the vehicle according to claim 10, wherein the additional portion includes a shaded portion.

12. The display apparatus displaying the image of the surroundings of the vehicle according to claim 10, wherein the additional portion is displayed along the main line so as to be positioned closer to the vehicle.

13. The display apparatus displaying the image of the surroundings of the vehicle according to claim 10, wherein the additional portion is displayed below the main line on the display monitor.

14. The display apparatus displaying the image of the surroundings of the vehicle according to claim 10, wherein the additional portion is displayed so as to be adjacent to the main line.

15. The display apparatus displaying the image of the surroundings of the vehicle according to claim 10, wherein the surroundings of the vehicle includes a view extending rearwardly of the vehicle.

16. The display apparatus displaying the image of the surroundings of the vehicle according to claim 10, wherein the display monitor superimposingly displays the image of the surroundings of the vehicle captured by the camera, the distance indicator line and a pair of lines, which extend to right and left in a direction to which the vehicle is expected to move, and the distance indicator extends in a right-left direction relative to the pair of lines.

17. The display apparatus displaying the image of the surroundings of the vehicle according to claim 16, wherein the distance indicator line is displayed between the pair of lines.

18. The display apparatus displaying the image of the surroundings of the vehicle according to claim 16, wherein the distance indicator line is displayed only in the vicinity of the pair of lines.

19. The display apparatus displaying the image of the surroundings of the vehicle according to claim 10, wherein the main line is displayed in a red color.

20. A display apparatus displaying an image of surroundings of a vehicle, comprising:
    a camera capturing the image of the surroundings of the vehicle; and
    a display monitor provided inside the vehicle for superimposingly displaying the image of the surroundings of the vehicle captured by the camera and a distance indicator line, which indicates a position a predetermined distance away from the vehicle, wherein
    the distance indicator line includes a main line and an additional portion, which is displayed so as to extend adjacently along and touching the main line in order to enhance a visibility of the main line.

* * * * *